US011263608B2

(12) United States Patent
Gruen et al.

(10) Patent No.: US 11,263,608 B2
(45) Date of Patent: Mar. 1, 2022

(54) ELECTRONIC VOUCHER MANAGEMENT FOR ATTRACTION ACCESS

(71) Applicant: ZM Ventures LLC, New York, NY (US)

(72) Inventors: Allan Gruen, Brooklyn, NY (US); Boris Yudasin, Spring Valley, NY (US)

(73) Assignee: ZM Ventures LLC, New York, NY (US)

( * ) Notice: Subject to any disclaimer, the term of this patent is extended or adjusted under 35 U.S.C. 154(b) by 144 days.

(21) Appl. No.: 16/455,060

(22) Filed: Jun. 27, 2019

(65) Prior Publication Data
US 2020/0005350 A1 Jan. 2, 2020

Related U.S. Application Data

(60) Provisional application No. 62/691,384, filed on Jun. 28, 2018.

(51) Int. Cl.
*G06Q 20/14* (2012.01)
*G06Q 20/04* (2012.01)
(Continued)

(52) U.S. Cl.
CPC ......... *G06Q 20/145* (2013.01); *G06Q 20/045* (2013.01); *G06Q 20/0855* (2013.01);
(Continued)

(58) Field of Classification Search
CPC ............ G06Q 20/145; G06Q 30/0221; G06Q 20/045; G06Q 20/405; G06Q 20/0855; G07C 9/27; G06K 19/06037
See application file for complete search history.

(56) References Cited

U.S. PATENT DOCUMENTS 5,287,269 A 2/1994 Dorrough et al.
6,173,209 B1 1/2001 Laval et al.
(Continued)

FOREIGN PATENT DOCUMENTS

WO 2012174261 A2 12/2012

OTHER PUBLICATIONS

Andre, et al., "Leading the Ticketing Revolution—Evolving the Industry Standard from Paper Tickets to Mobile Gate-Ready Access." Gateway Ticketing Systems, Nov. 26, 2018, https://www.gatewayticketing.com/community/revolution-paper-to-mobile-tickets/.

(Continued)

*Primary Examiner* — Sonji N Johnson
(74) *Attorney, Agent, or Firm* — Kim IP Law Group LLC

(57) ABSTRACT

Computer-readable media, methods, and apparatuses are disclosed for voucher management for attraction access. The computer-readable medium includes instructions stored thereon, which when executed on a processor, perform steps of receiving, from an attraction verification terminal for an attraction site, an access request for a customer presenting an access identifier. The instructions are also configured to retrieve, from a voucher engine, an attraction voucher based on the access identifier, and determine whether the attraction voucher has previously been validated. The instructions are also configured to construct access privilege data based on the attraction voucher. Upon a positive determination of a validation flag for the access privilege data, the instructions are also configured to construct and transmit, to the attraction verification terminal, a virtual access token permitting the access request for the customer to access the attraction site.

20 Claims, 10 Drawing Sheets

(51) Int. Cl.
*G06Q 20/40* (2012.01)
*G06Q 20/08* (2012.01)
*G07C 9/27* (2020.01)
*G06Q 30/02* (2012.01)
*G06K 19/06* (2006.01)

(52) U.S. Cl.
CPC ....... *G06Q 20/405* (2013.01); *G06Q 30/0221* (2013.01); *G07C 9/27* (2020.01); *G06K 19/06037* (2013.01)

(56) References Cited

U.S. PATENT DOCUMENTS

| | | | |
|---|---|---|---|
| 7,400,932 | B2 | 7/2008 | Ackley et al. |
| 7,765,128 | B2 | 7/2010 | Brooks et al. |
| 8,083,133 | B2 | 12/2011 | Seifert et al. |
| 8,775,303 | B2 | 7/2014 | Higgins et al. |
| 9,361,620 | B2 | 6/2016 | Evans et al. |
| 9,378,470 | B2 * | 6/2016 | McLaughlin .......... G06Q 10/02 |
| 9,639,670 | B2 | 5/2017 | Kacharia et al. |
| 9,715,602 | B1 * | 7/2017 | Fowler .................. G06Q 10/02 |
| 2002/0116235 | A1 | 8/2002 | Grimm et al. |
| 2003/0171145 | A1 | 9/2003 | Rowe |
| 2004/0267619 | A1 | 12/2004 | Watts |
| 2005/0060173 | A1 * | 3/2005 | Hale ...................... G06Q 10/02 705/5 |
| 2011/0015976 | A1 | 1/2011 | Lempel et al. |
| 2011/0270665 | A1 | 11/2011 | Kim et al. |
| 2011/0281630 | A1 | 11/2011 | Omar |
| 2011/0313831 | A1 | 12/2011 | Ku |
| 2013/0097006 | A1 | 4/2013 | Evans et al. |
| 2013/0144733 | A1 | 6/2013 | Rothschild |
| 2013/0282536 | A1 | 10/2013 | Mohazzabfar et al. |
| 2014/0358599 | A1 | 12/2014 | McLaughlin et al. |
| 2016/0092797 | A1 | 3/2016 | Clarke et al. |
| 2016/0125492 | A1 | 5/2016 | Walker et al. |
| 2016/0300162 | A1 | 10/2016 | McManus |
| 2017/0364936 | A1 | 12/2017 | Balfour et al. |

OTHER PUBLICATIONS

International Search Report dated Oct. 2, 2019 in International Patent Application No. PCT/US2019/039549.
Written Opinion dated Oct. 2, 2019 in International Patent Application No. PCT/US2019/039549.
LivingSocial—Local Deals, 2018, LivingSocial, Inc., Mobile Application Software, https://play.google.com/store/apps/details?id=com.livingsocial.
Groupon—Shop Deals, Discounts, & Coupons, 2018, Groupon, Inc., Mobile Application Software, https://play.google.com/store/apps/details?id=com.groupon.
Slickdeals; Coupons & Shopping, 2018, Slickdeals, Mobile Application Software, https://play.google.com/store/apps/details?id=net.slickdeals.android.
Ticketmaster Event Tickets, 2018, Ticketmaster LLC, Mobile Application Software, https://play.google.com/store/apps/details?id=com.ticketmaster.mobile.android.na.
Klook: Sightseeing Tours, Activities & Experiences, 2018, Klook Travel Technology Ltd., Mobile Application Software, https://play.google.com/store/apps/details?id=com.klook.
StubHub—Tickets To Sports, Concerts & Events, 2018, StubHub, Mobile Application Software, https://play.google.com/store/apps/details?id=com.stubhub.
Coupons and Deals—Save Money, 2018, Coupons Club Inc., Mobile Application Software, https://play.google.com/store/apps/details?id=coupons.deals.voucher.freebies.

* cited by examiner

```
<div class="pass-qrcode">
    <div><img width="100%" src=https://www.citysights.com/media/wysiwyg/cs/CSpass.png alt="" /></div>
    <div class="data">
        <span class="qrcode text">e4b1c4e08d1cd6</span><br>
        <span class="passenger text">John Smith Adult</span>
    </div>
    <div class="qrcode-image"><img src="https://www.citysights.com/ordervoucher/print/passqrcode/content/e4b1c4e08d1cd6/" /></div>
</div>
```

ELECTRONIC VOUCHER MANAGEMENT FOR ATTRACTION ACCESS

CROSS-REFERENCE TO RELATED APPLICATIONS

This application claims the benefit of U.S. Provisional Patent Application No. 62/691,384 filed Jun. 28, 2018 and entitled "ATTRACTION ACCESS SYSTEM WITH CONTRACT ENGINE AND VOUCHER ENGINE," the entire disclosure of which is hereby incorporated by reference herein for all purposes.

FIELD OF THE INVENTION

The subject application generally relates to systems and methods for providing access to facilities, places, and events that require authorization or a fee for entrance, purchase, or use (such as tourist attractions). In particular, the subject application relates to systems and methods for providing such attraction access using customer-held passes that incorporate a variety of voucher validation schemes.

BACKGROUND OF THE INVENTION

Customers are accustomed to purchasing vouchers or passes, such as conventional paper tickets or electronic wristbands, to allow access to attraction sites. The customer typically purchases an electronic wristband and the attraction site includes a scanner that scans the electronic wristband. The wristband may allow access to one or more attraction sites, either immediately when the customer first visits the attraction site, or later.

BRIEF SUMMARY OF THE INVENTION

In accordance with an exemplary embodiment, the subject disclosure provides a non-transitory computer-readable medium for permitting access to an attraction site. The computer-readable medium includes instructions stored thereon, which when executed on a processor, perform steps of receiving, from an attraction verification terminal for an attraction site, an access request for a customer presenting an access identifier. The instructions also include retrieving, from a voucher engine, an attraction voucher based on the access identifier, and determining whether the attraction voucher has previously been validated. The instructions also include constructing access privilege data based on the attraction voucher. The constructing access privilege data includes, if the attraction voucher has previously been validated, then determining, from the voucher engine, multi-access metadata indicating whether the attraction voucher permits repeated access to the attraction site for the customer. The constructing access privilege data also includes, otherwise, attempting to retrieve, from the voucher engine, an access credit for the attraction voucher, the access credit operable to permit a single access to the attraction site for the customer, and upon retrieving the access credit, removing, using the voucher engine, the access credit from the attraction voucher. The constructing access privilege data also includes setting a validation flag for the access privilege data upon a successful determination of the multi-access metadata or successful retrieval of the access credit. The instructions also include, upon a positive determination of the validation flag for the access privilege data, constructing and transmitting, to the attraction verification terminal, a virtual access token permitting the access request for the customer to access the attraction site.

In accordance with further aspects of the exemplary embodiment, the computer-readable medium further includes instructions configured to retrieve, from a rules base, one or more validation rules based on the attraction voucher. The computer-readable medium still further includes instructions configured to execute, using a rules engine, the one or more validation rules to determine whether to modify the access privilege data. A validation rule in the one or more validation rules is configured to modify the access privilege data to add the multi-access metadata and remove the access credit based on order data or customer data. A validation rule in the one or more validation rules includes a time delay limitation, a time limitation, a location limitation, or a distance limitation for the attraction site. The instructions configured to retrieve the attraction voucher include instructions configured to retrieve, from the voucher engine, a plurality of potential attraction vouchers based on one or more voucher selection rules retrieved from a rules base and select the attraction voucher among the potential attraction vouchers based on one or more voucher ranking rules retrieved from the rules base. The access identifier includes a universal access identifier, a virtual attraction pass, a credit card, a debit card, a quick response (QR) code, a two-dimensional barcode, or a one-dimensional barcode. The instructions configured to receive the access request for the customer include instructions configured to receive, from the attraction verification terminal, scan results to validate the access identifier for the customer.

In accordance with another exemplary embodiment, the subject disclosure provides a method for permitting access to an attraction site. The method includes receiving, from a vendor, order data identifying an order placed by a customer for access to an attraction site. The order data includes an access identifier that would initially be invalid if validated by a voucher engine. The method also includes extracting and storing, using the voucher engine, the access identifier from the received order data. The method also includes, upon receiving, from an attraction verification terminal for an attraction site, an access request for a customer presenting the access identifier, determining and validating access privilege data for the customer based on the access request and access identifier, and transmitting, to the attraction verification terminal, a virtual access token permitting the access request for the customer to access the attraction site upon a determination that the access privilege data is valid.

In accordance with further aspects of the exemplary embodiment, the order data includes a structured email message or structured markup. The extracting and storing the access identifier includes parsing the structured email message to identify the access identifier and storing the retrieved access identifier into a voucher data store. The order data further includes a customer identifier, name, and contact information for the customer. The access identifier includes a universal access identifier, a virtual attraction pass, a credit card, a debit card, a quick response (QR) code, a two-dimensional barcode, or a one-dimensional barcode. The receiving the access request for the customer comprises receiving, from the attraction verification terminal, scan results to validate the access identifier for the customer.

In accordance with another exemplary embodiment, the subject disclosure provides an apparatus for permitting access to an attraction site. The apparatus includes a processor configured to receive, from an attraction verification terminal for an attraction site, an access request for a customer presenting an access identifier. The processor is also configured to retrieve, from a voucher engine, a plurality of potential attraction vouchers based on the access identifier. The processor is also configured to rank the plurality of potential attraction vouchers and select an attraction voucher among the ranked plurality of potential attraction vouchers. The processor is also configured to construct and validate access privilege data based on the selected attraction voucher. The processor is also configured to construct and transmit, to the attraction verification terminal, a virtual access token permitting the access request for the customer to access the attraction site upon a determination that the access privilege data is valid.

In accordance with further aspects of the exemplary embodiment, the processor configured to retrieve a plurality of potential attraction vouchers based on the access identifier includes the processor being configured to retrieve, from a rules base, one or more voucher selection rules and execute, using a rules engine, the one or more voucher selection rules to identify the plurality of potential attraction vouchers. The processor configured to rank the plurality of potential attraction vouchers and select the attraction voucher among the ranked plurality of potential attraction vouchers includes the processor being configured to retrieve, from a rules base, one or more voucher ranking rules and execute, using a rules engine, the one or more voucher ranking rules to rank the plurality of potential attraction vouchers. The access identifier includes a universal access identifier, a virtual attraction pass, a credit card, a debit card, a quick response (QR) code, a two-dimensional barcode, or a one-dimensional barcode. The processor configured to receive the access request for the customer includes the processor being configured to receive, from the attraction verification terminal, scan results to validate the access identifier for the customer. The attraction site includes a sightseeing experience, a bus tour, a boat tour, a helicopter tour, a walking tour, a bicycle tour, a building tour, a theatre show, a play, a musical, a museum, an observatory, a restaurant, a food or drink experience, a shopping experience, an escape room, a library, or a historical building.

BRIEF DESCRIPTION OF THE SEVERAL VIEWS OF THE DRAWINGS

The foregoing summary, as well as the following detailed description of several aspects of the subject application, will be better understood when read in conjunction with the appended drawings. For the purpose of illustrating the subject application there are shown in the drawings several aspects, but it should be understood that the subject application is not limited to the precise arrangements and instrumentalities shown.

In the drawings:

FIGS. 2A-2B depict an exemplary voucher for attraction access in accordance with an embodiment of the present invention;

DETAILED DESCRIPTION OF THE INVENTION

Figure 1:
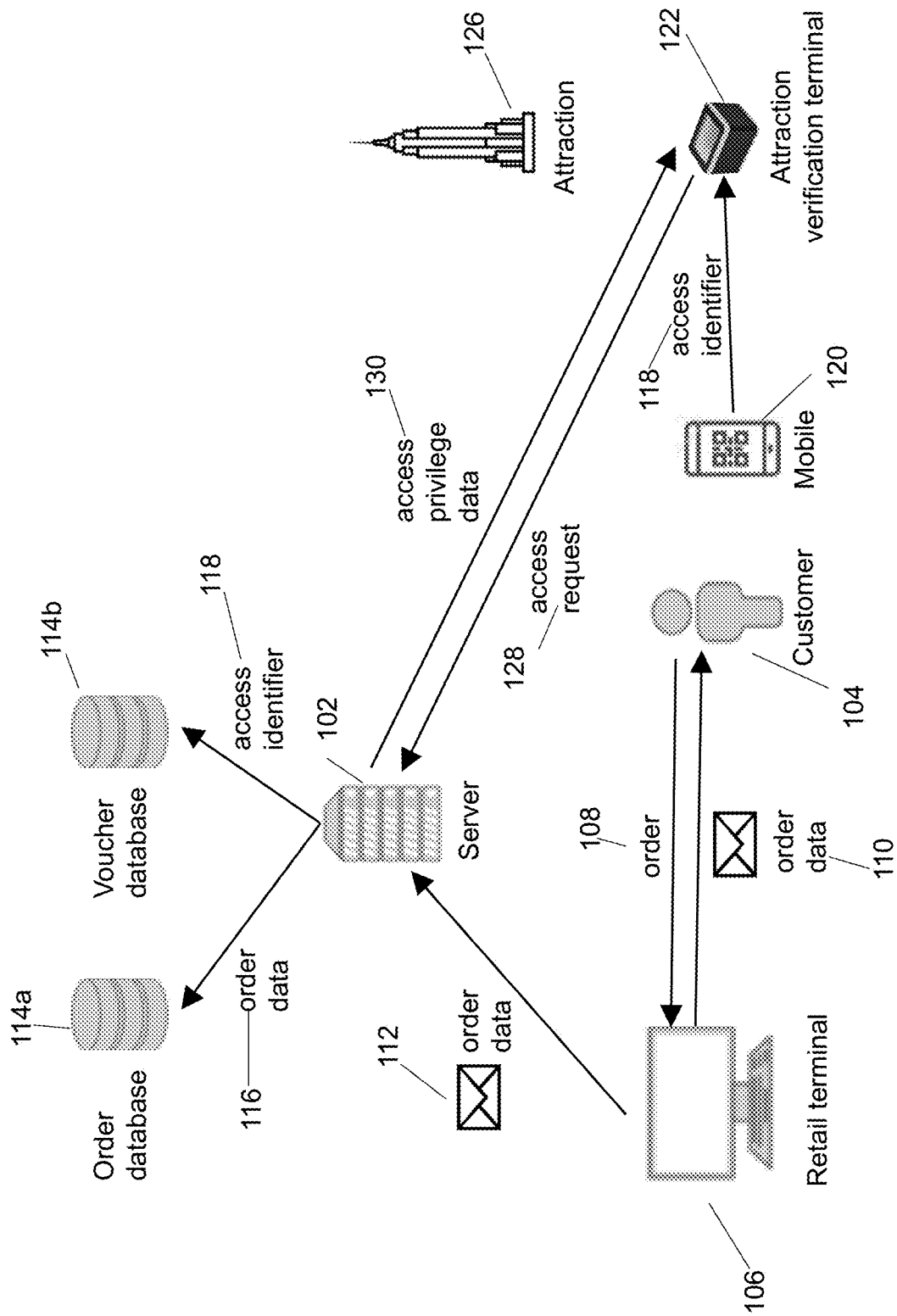
FIG. 1 depicts a block diagram of an exemplary customer access to an attraction in accordance with an embodiment of the present invention.

As discussed in greater detail herein, the present disclosure describes systems and methods that allow for voucher management for attraction access by customers. In an exemplary embodiment, the subject attraction access system receives, from an attraction verification terminal for an attraction site, an access request for a customer presenting an access identifier. The attraction access system retrieves, from a voucher engine, an attraction voucher based on the access identifier, and determines whether the attraction voucher has previously been validated. The attraction access system constructs access privilege data based on the attraction voucher using multi-access metadata and access credits. Upon a positive determination of a validation flag for the access privilege data, the attraction access system constructs and transmits, to the attraction verification terminal, a virtual access token permitting the access request for the customer to access the attraction site. The attraction access system is also operable to modify the access privilege data to add the multi-access metadata and remove the access credit, based on order data or customer data.

In another exemplary embodiment, the subject attraction access system receives, from a vendor, order data identifying an order placed by a customer for access to an attraction site. The order data includes an access identifier that would initially be invalid if validated by a voucher engine. The attraction access system extracts and stores, using the voucher engine, the access identifier from the received order data. Upon receiving, from an attraction verification terminal for an attraction site, an access request for a customer presenting the access identifier, the attraction access system determines and validates access privilege data for the customer based on the access request and access identifier, and transmits, to the attraction verification terminal, a virtual access token permitting the access request for the customer to access the attraction site upon a determination that the access privilege data is valid.

In yet another exemplary embodiment, the subject attraction access system receives, from an attraction verification terminal for an attraction site, an access request for a customer presenting an access identifier. The attraction access system retrieves, from a voucher engine, a plurality of potential attraction vouchers based on the access identifier. The attraction access system ranks the plurality of potential attraction vouchers and selects an attraction voucher among the ranked plurality of potential attraction vouchers. The attraction access system constructs and validates access privilege data based on the selected attraction voucher. The attraction access system constructs and transmits, to the attraction verification terminal, a virtual access token permitting the access request for the customer to access the attraction site upon a determination that the access privilege data is valid.

Reference will now be made in detail to the various aspects of the subject application illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

Furthermore, the subject application references certain methods or processes that are described and presented as a series of ordered steps. It should be understood that the steps described with respect to those processes are not to be understood as enumerated consecutive lists but could be performed in various orders while still embodying the invention described herein.

An object of the present attraction access system is to improve the reliability and accuracy of customer order and attraction access transactions that allow customers to access attraction sites.

The present attraction access system addresses this object by selecting an appropriate voucher automatically among multiple vouchers to allow attraction access. The attraction access system identifies one or more potential vouchers and determines a hierarchy of potential vouchers according to rules in a rules base that are selected based on an access identifier, customer data, order data, or voucher data. The attraction access system also allows reuse of existing vouchers by modifying multi-access metadata and access credit data, or by reusing an access identifier issued by a third party. In this regard, the attraction access system improves the functioning of a general-purpose or special-purpose computer and a special-purpose attraction verification terminal with which the computer communicates.

Referring now to FIG. 1, a block diagram of an exemplary customer access to an attraction is shown in accordance with an embodiment of the present attraction access system. A customer 104 initiates an order 108 at a retail terminal 106 to allow the customer or related parties to tour, visit, or otherwise access an attraction site 126. Non-limiting example attraction sites may include a sightseeing experience, a bus tour, a boat tour, a helicopter tour, a walking tour, a bicycle tour, a building tour, a theatre show, a play, a musical, a museum, an observatory, a restaurant, a food experience, a shopping experience, an escape room, a library, or a historical building.

The retail terminal runs a web-based or mobile application that allows the customer to initiate an order. The order application is accessible via a device under the control or ownership of a third party, such as a retailer, vendor, distributor, reseller, or attraction owner. Example devices include a desktop computer, laptop computer, mobile device, or tablet. The retail terminal 106 receives the order 108. The retail terminal constructs order data 110 based on the order and sends the order data to the customer. The retail terminal sends a copy of the order data 112 to the server 102.

Upon receipt of the order data 112, the server analyzes and processes the order data. For example, the server may be configured to process the order data 112 by extracting an access identifier 118 from the order data. The server may save a copy 116 of the order data into an order database 114a and store the extracted access identifier 118 into a voucher database 114b. In general, the voucher includes an access identifier that allows access to one or more attraction sites over a given time period. Prior to processing the order data and extracting the access identifier, the access identifier may not exist in the voucher database. Thus, the present voucher management system for attraction access allows reuse of a voucher system administered by a third party to facilitate attraction access without having to generate a new access identifier for the customer.

An attraction verification terminal 122 at the attraction site 126 scans the access identifier 118. In some aspects, the customer 104 presents his or her mobile device 120 with a copy of the access identifier 118. The attraction verification terminal may be special-purpose hardware such as a stand-alone terminal capable of scanning quick-response (QR) barcodes, matrix barcodes, or other multi-dimensional or one-dimensional barcodes. For example, an Alacrity 8200 series desktop barcode scanner or a Symcode Omnidirectional desktop barcode scanner, both provided by Shenzhen Alacrity Barcode Technology Co., Ltd. of Shenzhen, China may be used. Alternatively, the attraction verification terminal may be a mobile app that executes on general-purpose hardware such as a mobile device and uses a camera embedded in the mobile device to optically scan the access identifier. In other aspects, the attraction verification terminal may be a point-of-sale terminal of the type used to read guest cards such as credit cards or debit cards. In still other aspects, the attraction verification terminal may receive the access identifier as a series of characters entered directly into an online platform (such as from an attraction operator via a keyboard). The attraction verification terminal constructs an access request based on the access identifier and transmits the access request to the server 102.

The attraction access system receives the access request 128 with the access identifier 118, and determines and validates access privilege data 130 based on the received access request. The attraction access system transmits the access privilege data to the attraction verification terminal, which determines whether to allow the customer to access the attraction site based on the access privilege data.

Figure 2A:
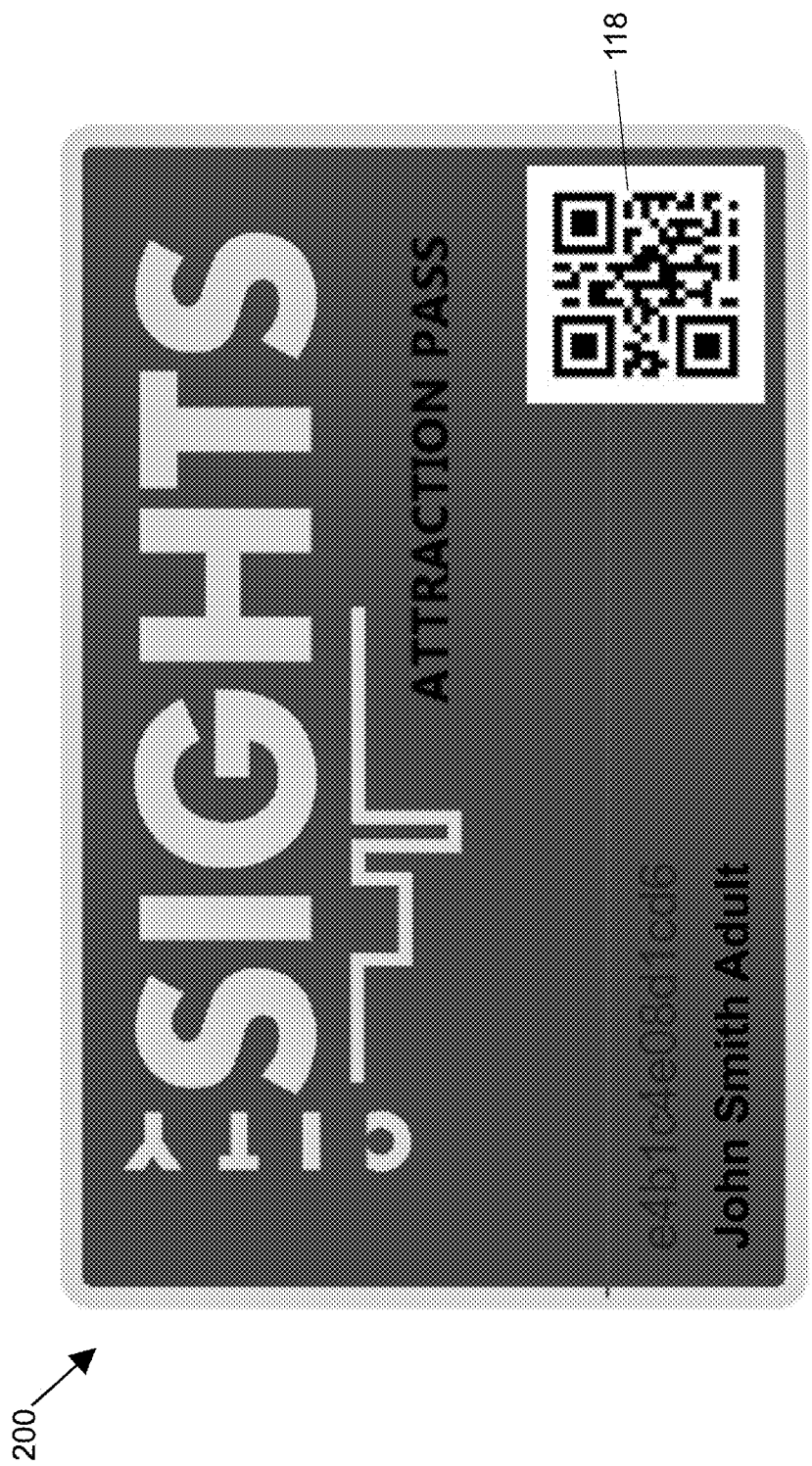

Referring now to FIG. 2A, a sample voucher 200 for attraction access is shown in accordance with an embodiment of the present attraction access system. The voucher may be displayed on a mobile device (shown in FIG. 1), for example via a mobile app or mobile web browser. The customer may also receive the access identifier in an email that may be displayed on a mobile device.

The voucher 200 includes an access identifier 118. The access identifier allows access to one or more attraction sites over a given time period. Although FIG. 2A depicts the access identifier as a quick response (QR) code, the access identifier may include a number of forms. For example, the access identifier may be a barcode such as a quick response (QR) code, a two-dimensional barcode, or a one-dimensional barcode. Alternatively, the access identifier may be a guest card with an associated currency balance that allows access to attraction sites until the balance is depleted.

Referring now to FIG. 2B, a sample structured voucher 210 for attraction access is shown in accordance with an embodiment of the present attraction access system. The structured voucher 210 corresponds to the sample voucher 200 (shown in FIG. 2A). For example, FIG. 2B illustrates a portion of HyperText Markup Language (HTML) data for the structured voucher. When a web browser renders the HTML, the customer's mobile device displays the sample voucher 200 including the access identifier 118 (shown in FIG. 2A). As described above, the present attraction access system may be configured to process order data from the customer by extracting an access identifier 118 from the order data. In some aspects, the present attraction access system extracts the access identifier by parsing corresponding HTML. The present attraction access system may traverse a document object model (DOM) for the HTML to identify corresponding portions of the access identifier. For example, the present attraction access system may identify a DOM node "pass-qrcode" with a subnode "qrcode-image" to save the access identifier that corresponds to the image stored at https://www.citysights.com/ordervoucher/print/passqrcode/content/e4b1c4e08d1cd6/into the voucher database.

Figure 3:
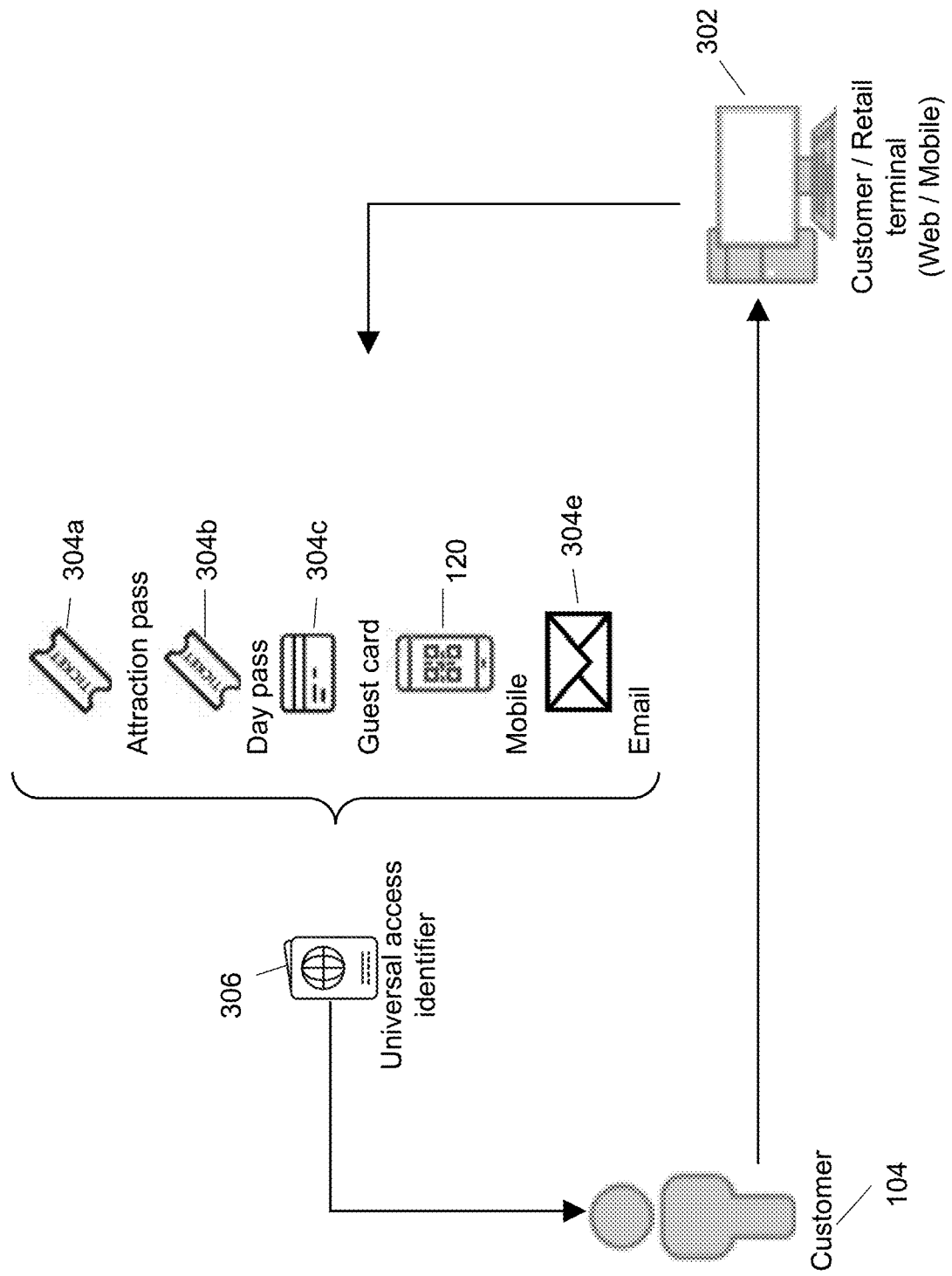
FIG. 3 depicts a block diagram of an exemplary customer order in accordance with an embodiment of the present invention.

Referring now to FIG. 3, a block diagram of an exemplary customer order is shown in accordance with an embodiment of the present attraction access system. A customer 104 initiates an order at a terminal 302 to allow the customer or related parties to tour, visit, or otherwise access an attraction site. The terminal may be a customer terminal or a retail terminal. The customer or retail terminal runs a web-based or mobile application that allows the customer to initiate an order. In the case of the customer terminal, the order application is accessible via a device under the control or ownership of the customer. In the case of the retail terminal, the order application is accessible via a device under the control or ownership of a third-party, such as a retailer, vendor, distributor, reseller, or attraction owner. Example devices include a desktop computer, laptop computer, mobile device, or tablet.

The customer 104 places an order via a third party and receives an access identifier 304a, 304b, 304c, 120, 304e from the third party or from the attraction access system. In general, the access identifier is a voucher that allows access to one or more attraction sites over a given time period. For example, the access identifier may be an attraction pass 304a that allows access to a limited or capped number of attraction sites and subsequently expires. The attraction pass may allow access to 1, 2, 3, 4, 5, 6, 7, 8, 9, 10, or any other number of attraction sites. Optionally, the attraction access system may further associate an expiration time period with the attraction pass, such as a two-day attraction pass that expires after three days. The access identifier may be a day pass 304b with an associated expiration date that allows access to an unlimited number of attractions during the activity period, such as a four-day pass. The access identifier may be a guest card 304c with an associated currency balance that allows access to attraction sites until the balance is depleted. The customer may preload or pre-purchase currency for use at attraction sites. In some aspects, the attraction access system allows the customer to select an attraction site and associate the pre-purchased currency with the selected attraction site, such that the currency is only available for use in connection with the selected attraction site and no other attraction site. The customer may also elect to refill the available balance periodically. The guest card may be a credit card or debit card. Additionally, the access identifier may be a barcode such as a quick response (QR) code, two-dimensional barcode, or one-dimensional barcode. As described above in connection with FIG. 1, the customer may receive the access identifier on a mobile device 120, for example via a mobile app or mobile web browser. The customer may also receive the access identifier in an email 304e.

The access identifier may be a universal access identifier 306. The universal access identifier is a unique identifier that is associated with a customer generally, rather than with a specific attraction. Accordingly, the universal access identifier may be configured to allow access to a limited or unlimited number of attraction sites for a limited or unlimited time period. The universal access identifier may be accessed in the form of a quick-response (QR) code presented on a mobile device or via email and scanned via a barcode scanner at an attraction verification terminal. The universal access identifier may also be accessed in the form of a guest card such as a credit card or debit card and scanned via a point-of-sale terminal. Advantageously, integration with a point-of-sale terminal would not require the attraction to maintain standalone barcode scanning hardware such as a barcode scanning terminal. The universal access identifier may be configured to associate a currency balance with the customer, for attraction access. The customer may elect to refill the currency balance periodically.

In some aspects, the universal access identifier 306 may also allow the present attraction access system to determine the most appropriate voucher among a plurality of vouchers. For example, the present attraction access system may identify an appropriate voucher by constructing a hierarchy of vouchers in accordance with selection rules that are retrieved from a rules base and applied using a rules engine.

When the customer presents the access identifier at an attraction verification terminal, the attraction verification terminal scans the access identifier and constructs an access request, as described in further detail herein. The present attraction access system receives the access request with the access identifier, and determines and validates access privilege data based on the received access request.

Figure 4:
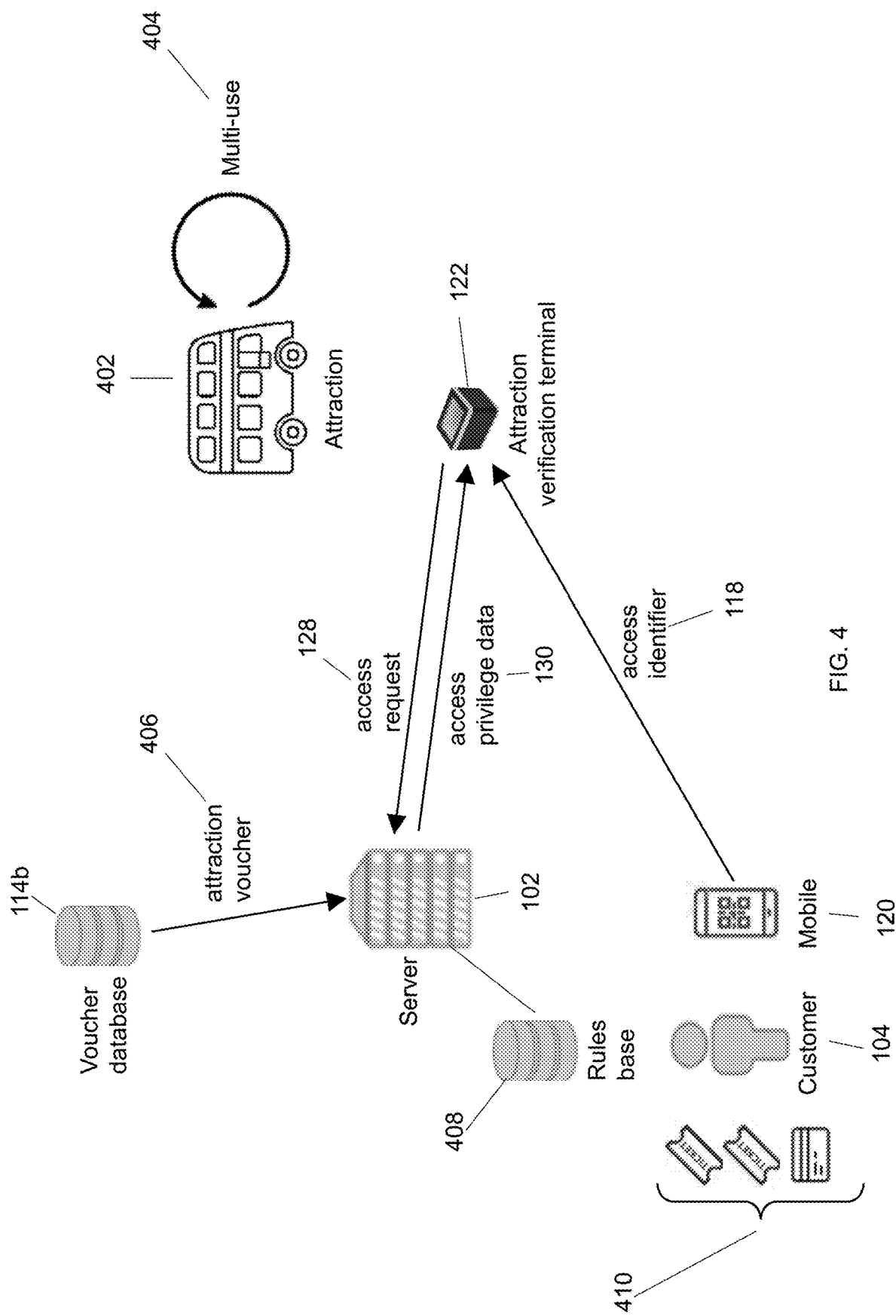
FIG. 4 depicts a block diagram of an exemplary customer access to an attraction site in accordance with an embodiment of the present invention.

Referring now to FIG. 4, a block diagram of an exemplary customer access to an attraction site is shown in accordance with an embodiment of the present invention. The customer 104 has placed an order and received multiple vouchers. The vouchers have various expiration dates and allow access to various attraction sites, including an attraction site 402 such as a bus tour.

The customer 104 presents an access identifier 118 on his or her mobile device 120 at an attraction verification terminal 122 associated with an attraction site 402. As described earlier, the attraction verification terminal constructs an access request 128 and sends the access request to the server 102. The access request 128 includes the access identifier 118.

Upon receiving the access request 128, the server 102 is configured to retrieve an attraction voucher based on the access identifier. In some aspects, the retrieved attraction voucher can be a single voucher that allows the customer 104 to access the attraction 402.

In other aspects, the retrieved attraction voucher can include multiple attraction vouchers based on the access identifier. For example, the attraction access system may determine voucher selection data based on the access identifier, such as a date, time, location, and customer for the access identifier. Based on the voucher selection data, the attraction access system may select one or more voucher selection rules from the rules base 408 and execute the rules to identify a collection 410 of multiple attraction vouchers. The voucher selection rules may be selected based on the voucher selection data, the access identifier, customer data, order data, product data, voucher data, third-party data, or any combination thereof. For example, the present attraction access system may determine that the collection includes potential vouchers A, B, and C. The present attraction access system iterates through the collection of potential vouchers to execute voucher validation rules for each voucher based on the voucher selection data. For example, the voucher validation rules may indicate that vouchers A and C are unexpired and valid to allow the customer 104 to access the attraction 402. In further aspects, the present attraction access system orders and ranks the collection of potential vouchers to determine a hierarchy of vouchers based on one or more voucher ranking rules. The attraction access system retrieves the top-most voucher from the voucher hierarchy to identify a most appropriate voucher to redeem for the attraction. The voucher selection rules, voucher validation rules, and voucher ranking rules may all be retrieved from the rules base 408 and executed using a rules engine.

Upon retrieving an attraction voucher, the present attraction access system constructs access privilege data 130 based on the attraction voucher. For example, the attraction access system determines whether the attraction voucher has been previously validated. If so, the attraction access system determines multi-access metadata for the attraction voucher from the voucher engine. The multi-access metadata indicates whether the attraction voucher permits repeated access to the attraction site for the customer. If the attraction voucher has not been previously validated, the attraction access system attempts to retrieve an access credit for the attraction voucher from the voucher engine. The access credit is operable to permit a single access to the attraction site for the customer. After retrieving the access credit, the attraction access system removes the access credit from the attraction voucher, so that a single-use attraction voucher cannot be reused. If the attraction access system successfully determines the multi-access metadata or successfully retrieves the access credit for the attraction voucher, the attraction access system sets a validation flag indicating such success. Upon a positive determination of the validation flag for the access privilege data, the attraction access system constructs and transmits a virtual access token to the attraction verification terminal 122. The virtual access token triggers the attraction verification terminal to permit access to the attraction site 402 for the customer 104.

In some aspects, the present attraction access system allows the customer 104 to convert a single-use attraction voucher into a multi-use attraction voucher. The attraction access system allows the customer 104 to convert an attraction voucher even after the customer has ordered and received the attraction voucher. For example, the attraction access system may retrieve a collection of validation rules from the rules base 408, based on the attraction voucher. For each validation rule in the collection of validation rules, the attraction access system executes each validation rule to determine whether to modify the corresponding access privilege data 130. Alternatively, the attraction access system may construct a new attraction voucher having new access privilege data for the customer instead of modifying the access privilege data for an existing attraction voucher.

In further aspects, the validation rules include fraud detection rules. Such fraud detection rules can protect against unauthorized voucher activity. For example, the customer 104 might attempt to access an attraction site 402 after the attraction voucher has expired. Alternatively, an attraction voucher may be configured to allow access only within a given geographical location. Accordingly, the fraud detection rules may include a time delay limitation, a time limitation, a location limitation, or a distance limitation for an attraction site.

Figure 5:
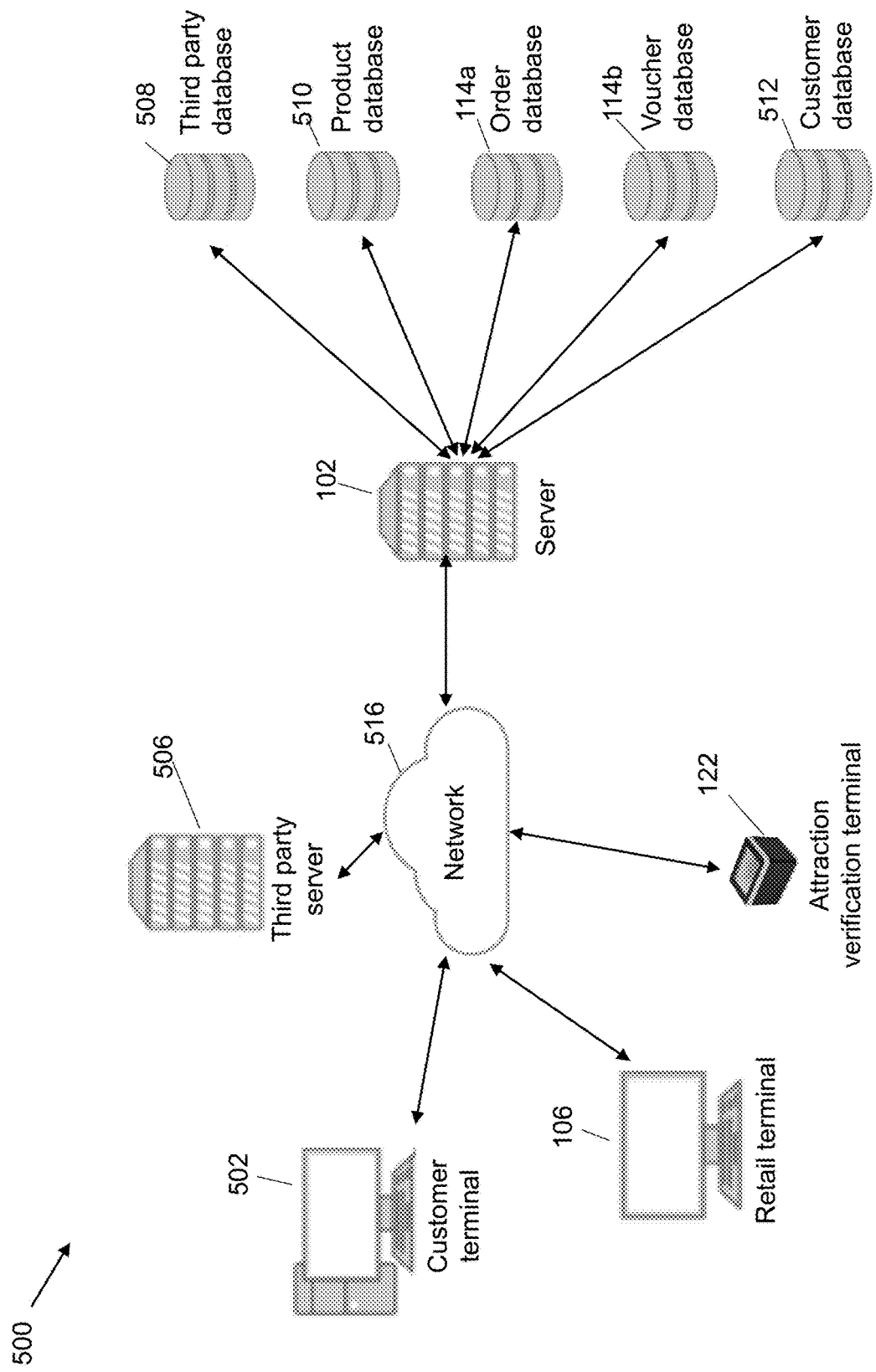
FIG. 5 depicts an exemplary system diagram of voucher management for attraction access in accordance with an embodiment of the present invention.

Referring now to FIG. 5, an exemplary computing system 500 is shown for voucher management for attraction access in accordance with an embodiment of the present invention and to perform the techniques depicted herein with respect to FIGS. 1-4 and 6-9. The depicted computing system environment is only one example of a suitable computing environment and is not intended to suggest any limitation as to the scope of use or functionality. This exemplary system includes, inter alia, a customer terminal 502, a retail terminal 106, an attraction verification terminal 122, a third-party server 506, and a server 102, which interface to each other via network 516.

The customer terminal 502 and retail terminal 106 receive and fulfill customer orders for vouchers or passes to tour attractions. It should be noted that the customer terminal and the retail terminal have a system memory suitable for local temporary or permanent storage of order data, customer data, product data, and voucher data, as needed (as described in further detail in connection with FIG. 9). In some aspects, network 516 is the Internet and the customer terminal and the retail terminal have an Internet connection that allows order data, customer data, product data, and voucher data to be uploaded and downloaded from the remote server 102.

The third-party server 506 is in communication with the customer terminal 502 or the retail terminal 106 over the network 516. The third-party server 506 is administered by a third-party offering vouchers or passes for sale to customers who wish to access various attractions. The third-party may include vendors, distributors, resellers, or attraction owners.

The attraction verification terminal 122 scans an access identifier that has been previously provided to the customer to generate an access request. For example, once the customer has completed his or her order at the customer terminal 502 or retail terminal 106, the customer receives an access identifier corresponding to the order. When the customer and related parties elect to tour an attraction, the customer scans the access identifier at an attraction verification terminal 122 that is near the attraction site. The attraction verification terminal constructs an access request corresponding to the access identifier, and transmits the access request over the network 516 to the server 102.

The server 102 communicates with the third-party database 508, the product database 510, the order database 114*a*, the voucher database 114*b*, and the customer database 512 to determine and validate access privilege data based on the access request. Upon a determination that the access privilege data is valid, the server constructs and transmits to the attraction verification terminal a virtual access token that allows the customer and related parties to access the attraction site.

The third party database 508, the product database 510, the order database 114*a*, the voucher database 114*b*, and the customer database 512 may be located in one or more databases or database tables resident on the server 102, an independent database or other memory accessible by the server 102, or a disk storage or other similar system suitable for storing and accessing electronic files. The third-party database 508 is configured to store data relating to third-parties, such as vendors, resellers, and distributors. The product database 510 is configured to store data relating to attraction sites or other products for which a customer may purchase a voucher or ticket and request access. The order database 114*a* is configured to store data relating to customer orders for attraction sites and tours thereof. The voucher database 114b is configured to store data relating to vouchers and tickets granting access to the attraction sites and tours. The customer database 512 is configured to store data relating to customers who purchase vouchers and tickets for attraction access.

Additionally, the server generates a hierarchy of vouchers that are potentially applicable to an attraction, based on the access identifier, customer data, order data, product data, voucher data, or any combination of the foregoing data. The attraction access system generates the hierarchy of vouchers by retrieving voucher selection rules, voucher validation rules, and voucher ranking rules based on the received access identifier, customer data, order data, a third-party identifier, or any combination of the foregoing data, as described in detail above.

The number of terminals 106, 502, servers 102, 506, and databases 508, 510, 114a, 114b, and 512 are merely exemplary and others may be omitted or added without departing from the scope of the present invention. Further, the databases 508, 510, 114a, 114b, and 512 may be combined into a single database and/or be included in server 102. It should also be appreciated that one or more databases, including the databases 508, 510, 114a, 114b, and 512 may be combined, provided in, or distributed across one or more of the servers 102, 506.

Figure 6:
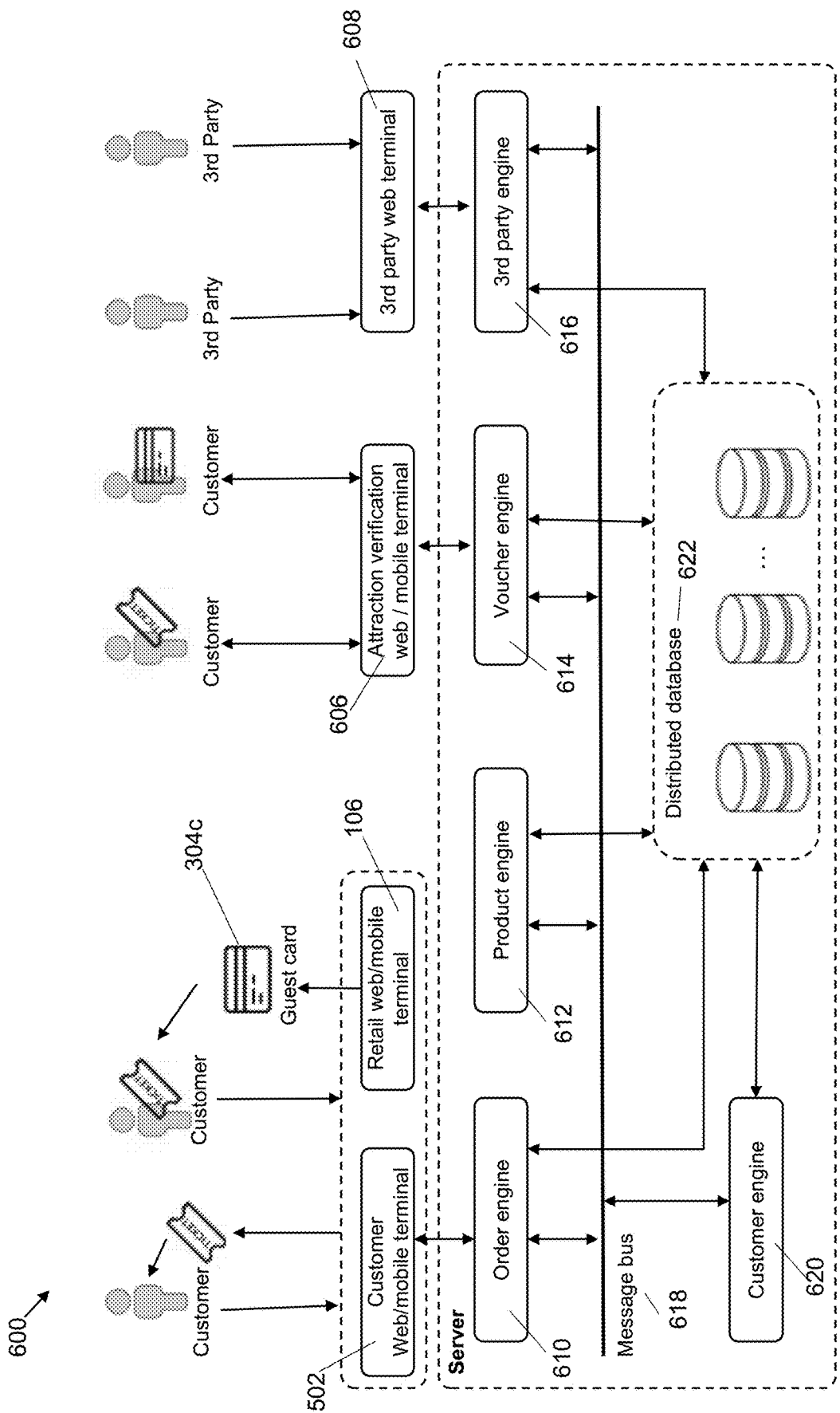
FIG. 6 depicts a diagram of an exemplary interaction between a customer and the attraction access system in accordance with an embodiment of the present invention.

Referring now to FIG. 6, a diagram of an exemplary interaction between a customer and the attraction access system 600 is shown in accordance with an embodiment of the present invention. The attraction access system 600 includes a customer engine 620, order engine 610, product engine 612, voucher engine 614, and third-party engine 616 in communication over a message bus 618 with each other and with a database 622. The database 622 may be a distributed database.

A customer may place an order at a customer terminal 502 or a retail terminal 106. The customer and retail terminal may be available to the customer online, such as via a website displayed on the customer or retail terminal. Alternatively, the customer and retail terminal may be available on a mobile device owned by the customer or by the retailer, such as via a mobile app or a mobile-optimized website. The customer terminal or retail terminal receives the customer order and determines order data, customer data, product data, and voucher data based on the customer order, for example by parsing and processing the received information. If the retail terminal receives the customer order, the retail terminal may additionally determine third-party data based on the received information.

Order data may include information relating to the price, desired date and time, products or attractions to visit, and expiration date for the customer's order. The order engine 610 receives, parses, and stores order data in communication with the database 622, the customer engine 620, and the product engine 413.

Customer data includes information relating to the customer and related parties. Non-limiting example customer data may include identifying information, such as names, ages, age groups, addresses, phone numbers, or dates of birth of the customer and related parties who are interested in touring attractions. The customer engine 620 receives and stores customer data in communication with the database 622.

Product data includes information relating to each attraction having tours offered for sale. Example product data includes an attraction name, owner, administrator, address, phone number, website, and hours of operation. The product engine 612 receives and stores product data in communication with the database 622.

Voucher data includes information relating to available vouchers offered by the attraction access system 600 along with customer-specific voucher information. Example voucher data includes an access identifier, any caps or limits on the number of attractions that the customer may visit, any limits or expirations on dates or times that a voucher or pass is valid, or any corresponding currency balance associated with a voucher or pass for a specific customer. The voucher engine 614 receives and stores voucher data in communication with the database 622.

After processing the customer data, order data, product data, and voucher data, the customer terminal 502 may issue a physical or virtual voucher to the customer. An access identifier (not shown) may be associated with the voucher. Example access identifiers may include a quick-response (QR) barcode, a matrix barcode, a two-dimensional barcode, a one-dimensional barcode, or other manner of encoding the access identifier in a manner so that the attraction verification terminal 606 is operable to decode the access identifier upon presentation by the customer for redemption for a visit or tour of the attraction.

Alternatively, the retail terminal 106 may process the customer data, order data, product data, and voucher data as discussed above in connection with the customer terminal 502. After processing such data, the retail terminal 106 may transmit an order to the present attraction access system to issue a physical guest card 304c to the customer, or the customer may elect to refill a currency balance associated with a previously issued guest card. As discussed above, the attraction access system may associate an access identifier (not shown) with the guest card. The attraction access system may use contract data in connection with third-party data to track physical or virtual contractual agreements established for each attraction that the customer desires to access.

The third-party terminal 608 may receive third-party data entered by a third party. The third-party data includes information relating to third parties of the attraction access system 600. Example third parties include vendors, distributors, and resellers offering for sale vouchers or access to attractions. Example third-party data includes a name, address, phone number, website, and email address for the third party. Additional information regarding third party data and third party management applicable to the present attraction access system is described in U.S. patent application Ser. No. 16/454,931 entitled "THIRD PARTY RELATIONSHIP MANAGEMENT FOR ATTRACTION ACCESS," the entire disclosure of which is hereby incorporated by reference herein for all purposes.

Figure 7:
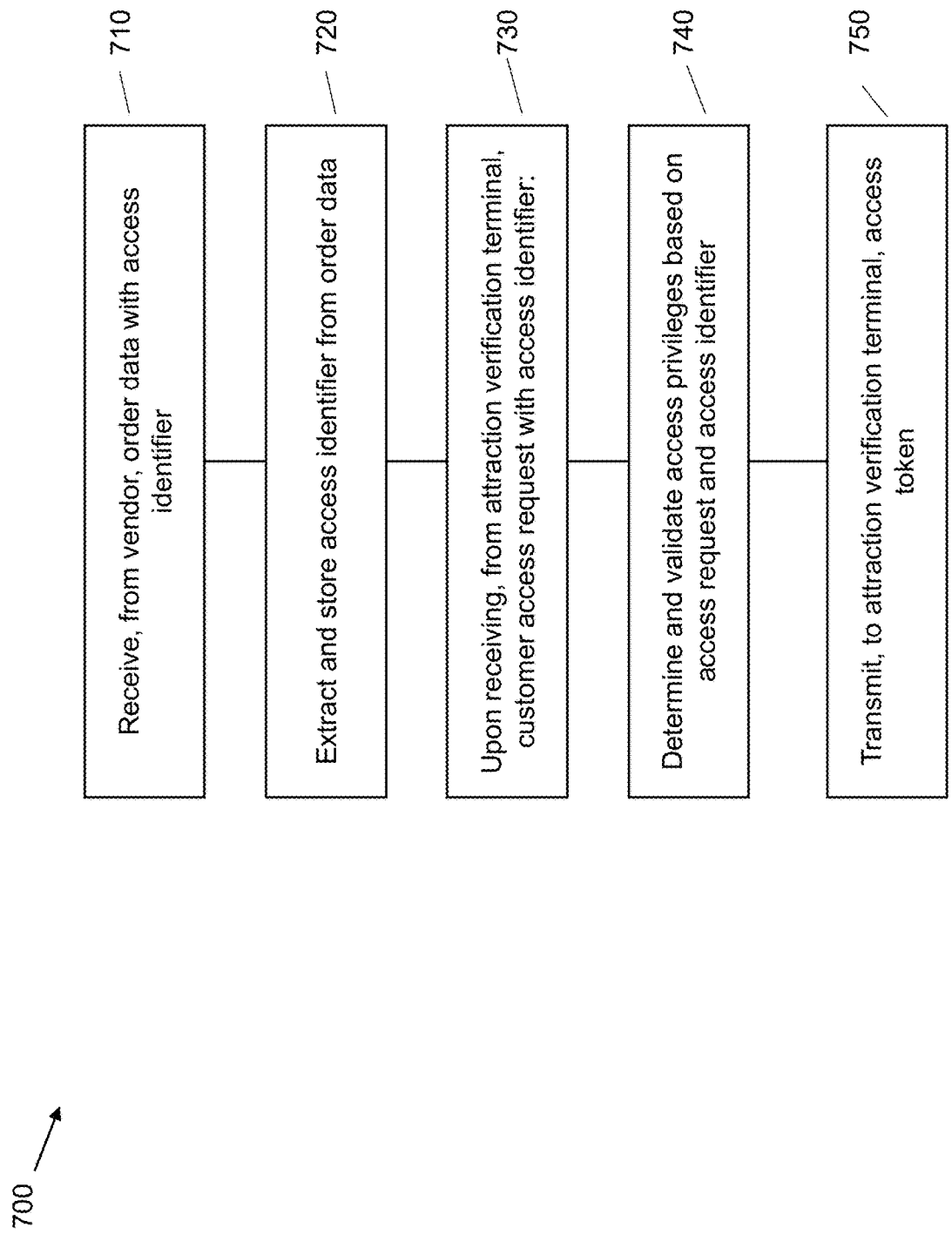
FIG. 7 is a flowchart depicting an exemplary method for voucher management for attraction access in accordance with an embodiment of the present invention.

Referring now to FIG. 7, a flowchart is shown depicting an exemplary method 700 for voucher management for attraction access in accordance with an embodiment of the present invention.

A server receives order data from a vendor (step 710). The order data identifies an order placed by a customer for access to an attraction site. The order data has an access identifier that would initially be invalid if validated by a voucher engine. In some aspects, the order data includes a structured email message or structured markup, such as structured HyperText Markup Language (HTML). In some aspects, the order data further includes a customer identifier, a name, and contact information for the customer. Non-limiting example access identifiers may include a universal access identifier, a virtual attraction pass, a credit card, a debit card, a quick response (QR) code, a two-dimensional barcode, or a one-dimensional barcode.

The server extracts and stores the access identifier from the received order data, using the voucher engine (step 720). In some aspects, the extracting and storing the access identifier includes parsing the structured email message or structured markup to identify the access identifier, and storing the received access identifier into a voucher data store such as a voucher database. In this regard, the present attraction access system is able to reuse an existing access identifier that is generated by a third-party, without the attraction access system needing to generate a new access identifier for the customer.

Upon receiving an access request for a customer presenting the access identifier (step 730), the server determines and validates access privilege data based on the access request (step 740). For example, the server retrieves corresponding customer data, voucher data, and product data from the customer database, voucher database, and product database based on the access identifier. The server identifies and retrieves access rules from a rules engine based on the voucher data, product data, and customer data. For example, the access rules may indicate that the customer's access to the attraction site is valid so long as the access request is made during operating hours of the attraction (as determined by the product data), and so long as the voucher is unexpired (as determined by the voucher data). The server executes the identified access rules using the rules engine to determine and validate access privilege data corresponding to the attraction site.

Upon a determination that the access privilege data is valid, the server transmits a virtual access token to the attraction verification terminal (step 750). The server constructs the virtual access token to permit the access request from the customer to access the attraction site.

Figure 8:
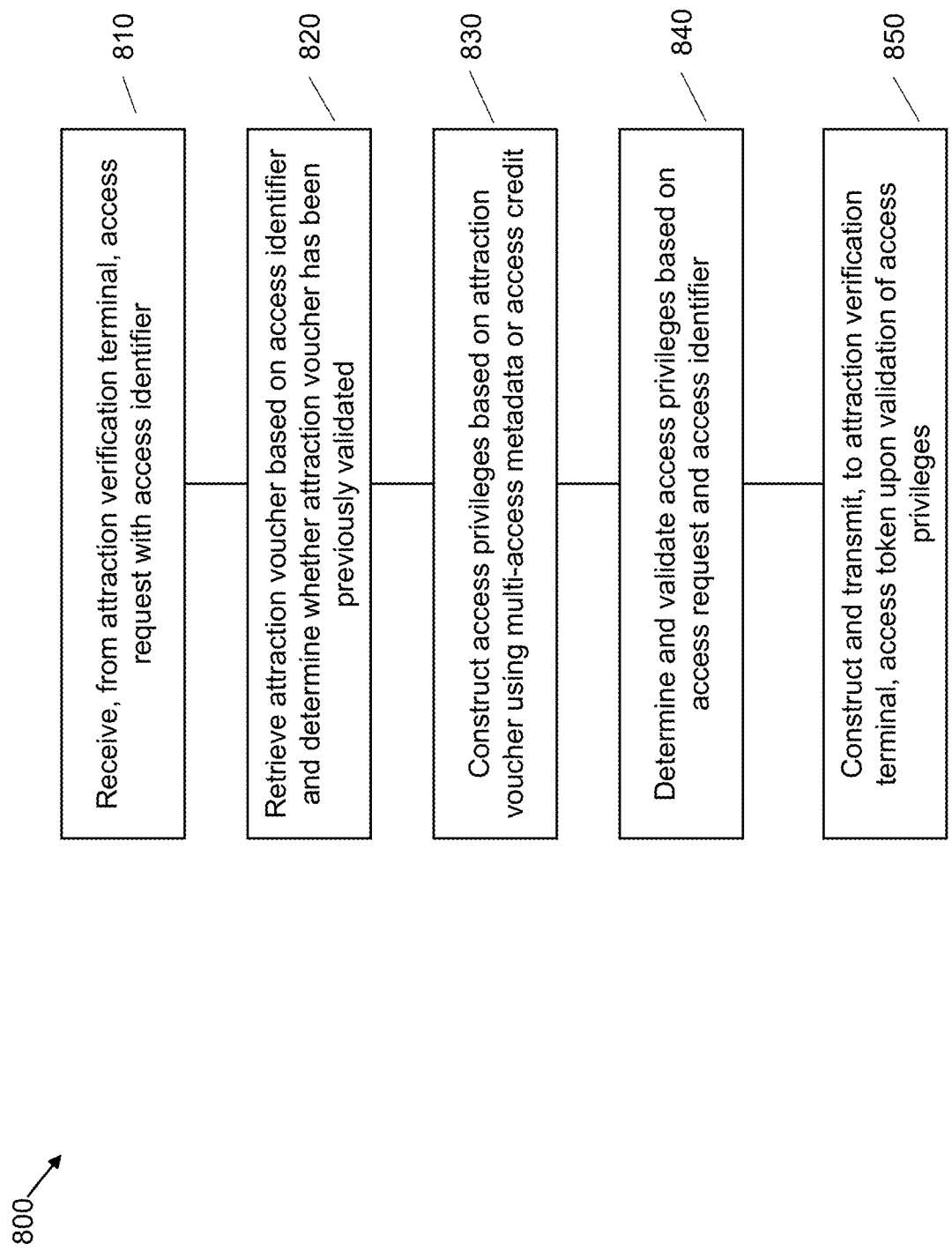
FIG. 8 is a flowchart depicting an exemplary method for voucher management for attraction access in accordance with an embodiment of the present invention.

Referring now to FIG. 8, a flowchart is shown depicting an exemplary method 800 for voucher management for attraction access in accordance with an embodiment of the present invention.

A server receives an access request from an attraction verification terminal for an attraction site (step 810). The access request is associated with a customer who presents an access identifier.

The server retrieves an electronic voucher based on the access identifier, and determines whether the voucher has previously been validated (step 820). In some aspects, retrieving the electronic voucher based on the access identifier can include retrieving multiple potential vouchers based on the access identifier from the voucher engine, and selecting a voucher among the potential vouchers based on a voucher selection rule. The voucher selection rule may be selected from a rules base in communication with the server.

In some aspects, determining whether the voucher has previously been validated can include retrieving voucher data associated with the voucher from the voucher database. The retrieved voucher data may contain a boolean, a flag, or another parameter indicating whether the voucher has previously been validated.

Based on the determination of whether the voucher has previously been validated, the server constructs access privilege data based on the voucher (step 830). For example, the server constructs access privilege data by using multi-access metadata or an access credit. If the voucher has previously been validated, the attraction access system determines multi-access metadata from the voucher engine. The multi-access metadata indicates whether the voucher permits repeated access to the attraction site for the customer. If the voucher has not previously been validated, the attraction access system attempts to retrieve an access credit for the voucher from the voucher engine. The access credit is operable to permit a single access to the attraction site for the customer. Upon retrieving the access credit, the attraction access system removes the access credit from the voucher, using the voucher engine.

Upon a successful determination of the multi-access metadata or successful retrieval of the access credit, the attraction access system determines and validates access privilege data based on the access request (step 840). For example, the server sets a validation flag for the access privilege data. Upon validation of the access privilege data, the attraction access system constructs and transmits a virtual access token to the attraction verification terminal (step 850). Receipt of the virtual access token triggers the attraction verification terminal to indicate approval of the access request and permit the customer to access the attraction site.

In some aspects, the method 800 may further include determining whether to modify the access privilege data to convert the attraction voucher from permitting a single access to the attraction site to permitting repeated access to the attraction site. For example, the attraction access system may retrieve from the rules base a collection of validation rules based on the attraction voucher. For each validation rule in the collection, the attraction access system may execute the validation rule using a rules engine to determine whether to modify the access privilege data. For example, the validation rule may indicate whether to add multi-access metadata to the attraction voucher, to convert the attraction voucher to permit repeated access to the attraction site.

In further aspects, the collection of validation rules may include fraud deterrence or fraud determination rules. For example, the fraud deterrence rules may include a time delay limitation, a time limitation, a location limitation, or a distance limitation for the attraction site.

Figure 9:
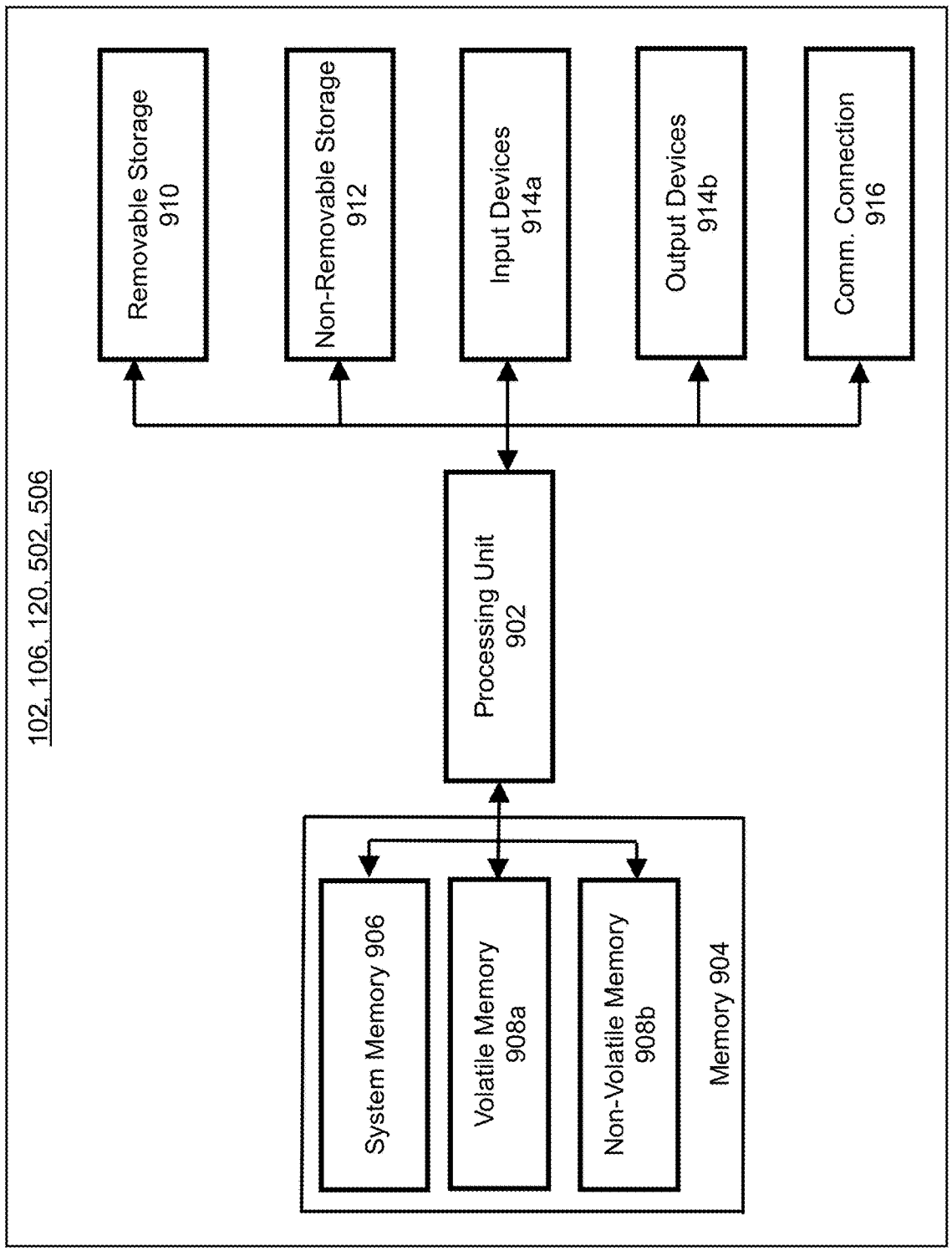
FIG. 9 depicts a block diagram of an exemplary computing device with which various embodiments of the present invention may be implemented.

Referring now to FIG. 9, a schematic view is shown of an exemplary computing device 102, 106, 120, 502, 506 on which various embodiments of the present invention may be implemented as described herein. For example, a user of a computing device such as the computing device 102, 106, 120, 502, 506 may utilize the device for voucher management in connection with attraction access and to perform the processes described herein with respect to FIGS. 7 and 8. The depicted computing system environments depicted in FIGS. 5 and 6 are exemplary of two suitable computing environments and are not intended to suggest any limitation as to the scope of use or functionality. Numerous other general-purpose or special-purpose computing system environments, computing devices, and configurations may be used or substituted. Examples of well-known computing systems, devices, environments, and/or configurations that may be suitable for use include, but are not limited to, personal computers ("PCs"), server computers, handheld or laptop devices, multiprocessor systems, microprocessor-based systems, network PCs, minicomputers, mainframe computers, e-readers, cell phones, tablets, embedded systems, distributed computing environments that include any of the above systems or devices, and the like.

Computer-executable instructions such as programs or program modules executed by a computing device or processing unit may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

The computing device 102, 106, 120, 502, 506, in its most basic configuration as depicted in FIG. 9, includes at least one processing unit 902 and at least one memory 908*a*, 908*b*. Depending on the exact configuration and type of the computing device, the memory may be volatile (such as random access memory ("RAM")), non-volatile (such as read-only memory ("ROM"), flash memory, etc.), or a combination of the two. In addition to that described herein, the computing device may be any network-accessible device (e.g., cell phone, smartphone, tablet, personal computer, server computer, or the like) including those operating via Android, Apple, Linux, Unix, and/or Windows mobile or non-mobile operating systems.

The computing device 102, 106, 120, 502, 506 may have additional features and functionality. For example, the computing device may include additional storage (such as removable and/or non-removable storage) including, but not limited to, magnetic or optical disks or tape, thumb drives, and external hard drives as applicable. Such additional storage is illustrated in FIG. 9 by removable storage 910 and non-removable storage 912.

The computing device 102, 106, 120, 502, 506 typically includes or is provided with a variety of computer-readable media. Computer-readable media can be any available media that can be accessed by the computing device and includes both volatile and non-volatile media, removable and non-removable media. By way of example, and not limitation, computer-readable media may comprise computer storage media and computer memory which contains on a transitory basis communication media that are streamed to the computing device via the communication connections 916.

Computer storage media includes volatile and non-volatile, removable and non-removable media implemented in any method or technology for storage of information such as computer-readable instructions, data structures, program modules or other data. Memory 904, removable storage 910, and non-removable storage 912 are all examples of computer storage media. Computer storage media includes, but is not limited to, RAM, ROM, electrically erasable programmable read-only memory ("EEPROM"), flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can accessed by the computing device 102, 106, 120, 502, 506. Any such computer storage media may be part of computing device as applicable.

The computing device 102, 106, 120, 502, 506 may also contain a communications connection 916 that allows the device to communicate with other devices. Communication media typically embodies computer-readable instructions, data structures, program modules and/or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, radio frequency ("RF"), infrared and other wireless media. The term computer-readable media as used herein includes both storage media and communication media.

The computing device 102, 106, 120, 502, 506 may also have input device(s) 914*a* such as a keyboard, mouse, pen, voice input device, touch input device, etc. Output device(s) 914*b* such as a display, speakers, printer, etc. may also be included. All these devices are generally known to those of ordinary skill in the art and therefore need not be discussed in any detail herein except as provided.

Notably, referring back to FIG. 5, the computing device 102, 106, 120, 502, 506 may be interconnected with a network 516. As may be appreciated, the network may be any appropriate network and the computing device may be connected thereto by way of an interface such as communication connections 916 in any appropriate manner, and the computing device may communicate with one or more of the other computing devices via the network in any appropriate manner. For example, the network may be a wired network, wireless network, or a combination thereof within an organization, a home, or the like, and may include a direct or indirect coupling to an external network such as the Internet or the like. Likewise, the network may be such an external network including, without limitation, the Internet.

In FIGS. 1 and 3-6 the depicted embodiments of the attraction access system use a standard client-server technology architecture, which allows users of the attraction access system to access information stored in a database such as the database 114*a*, 114*b*, 408, 508, 510, 512 via a user interface. The application or program may be in communication with a server such as the servers 102, 506 that is accessible via a network 516 such as the Internet using a publicly addressable Uniform Resource Locator (URL) in order to receive content to display. For example, users can access content from the attraction access system using any web-enabled device equipped with a web browser, such as the mobile device 120, the customer terminal 502, or the retail terminal 106. Communication between software components and subsystems are achieved by a combination of direct function calls, publish-and-subscribe mechanisms, stored procedures, and direct SQL queries, however, alternate components, methods, and/or subsystems may be substituted without departing from the scope hereof.

As shown in FIG. 9, the computing device 102, 106, 120, 502, 506 has a system memory 906 that is locally attached and/or integrated into the computing device. The local content store contains files suitable for processing by the system described herein. Such files may be obtained for storage on the memory 904, removable storage 910, and/or non-removable storage 912 through various techniques including, but not limited to, having been: downloaded via a network connection (e.g., from a network via communication connection 916); stored in a local buffer as a part of a media stream; pre-loaded on memory 904, removable storage 910, and/or non-removable storage 312; generated locally at the computing device; transferred from a removable storage device 910 (e.g., a flash drive) to memory 904; or similar methods of obtaining electronic files for storage on a storage device.

It should be understood that the various techniques described herein may be implemented in connection with hardware or software or, as appropriate, with a combination of both. Thus, the methods and apparatus of the presently disclosed subject matter, or certain aspects or portions thereof, may take the form of program code (i.e., instructions, scripts, and the like) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter (e.g., through the use of an application-program interface (API), reusable controls, or the like). Such programs may be implemented in as code in a high-level procedural or object-oriented programming language to communicate with a computer system. However, the program(s) can be implemented in assembly language or machine language, if desired. In any case, the code may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as the attraction access system 500, 600 or a distributed computing environment. Still further, aspects of the presently disclosed subject matter may be implemented in or across a plurality of processing chips or devices, and storage may similarly be effected across a plurality of devices in or connected with the attraction access system. Such devices might include personal computers, network servers, and handheld devices (such as, cell phones, tablets, smartphones, etc.), for example.

In the exemplary embodiments, the computing device 102, 106, 120, 502, 506 is programmed to execute a plurality of processes including those referenced with respect to FIG. 5 as discussed in detail above.

The various exemplary embodiments of the attraction access system discussed herein provide numerous advantages over conventional attraction access systems. For example, the present attraction access system selects an appropriate voucher automatically among multiple vouchers to allow attraction access. The attraction access system thus improves the reliability and accuracy of attraction access transactions between the attraction verification terminal and the server by allowing application of multiple vouchers, where each voucher could potentially allow attraction access. The attraction access system thus improves the functioning of a general-purpose computer and a special-purpose attraction verification terminal.

Another advantage of the present attraction access system is providing an attraction voucher that is convertible from a single-use voucher into a multi-use voucher. Allowing a customer to convert a single-use voucher into a multi-use voucher reduces latency and increases speed of customer order transactions. For example, such conversion allows a customer to reuse an existing voucher that has already been issued by the present attraction access system without requiring issuance of a new voucher and revocation of an existing voucher.

A further advantage of the present attraction access system is allowing reuse of access identifiers in third-party vouchers. Reuse of third-party access identifiers reduces latency and increases speed of customer order transactions, since the attraction access system is not required to generate a new access identifier and associate the new access identifier with an existing third-party voucher.

A still further advantage of the attraction access system is providing a universal access identifier associated with a customer. The universal access identifier allows the customer access to more than one attraction and improves the reliability and accuracy of access transactions between a server and an attraction verification terminal, for example by improving customer tracking.

A yet further advantage of the attraction access system is providing a guest card such as a debit or credit card as an access identifier. The guest card improves security and reliability of access transactions by enabling the customer to access an attraction without having to present a separate visual identifier such as a QR code or one-dimensional barcode.

It will be appreciated by those skilled in the art that changes could be made to the aspects described above without departing from the broad inventive concept thereof. It is to be understood, therefore, that the subject disclosure is not limited to the particular aspects and exemplary embodiments disclosed, but it is intended to cover modifications within the spirit and scope of the subject disclosure as defined by the claims.

We claim:

1. A non-transitory computer-readable medium for permitting access to an attraction site, comprising instructions stored thereon, which when executed on a processor, perform the steps of:

receiving, from an attraction verification terminal for an attraction site, an access request for a customer presenting an access identifier;

retrieving, from a voucher engine, an attraction voucher based on the access identifier, and determining whether the attraction voucher has previously been validated at the attraction site;

constructing access privilege data based on the attraction voucher, including:

if the attraction voucher has previously been validated at the attraction site, determining, from the voucher engine, multi-access metadata indicating whether the attraction voucher permits repeated access to the attraction site for the customer; and otherwise, attempting to retrieve, from the voucher engine, an access credit for the attraction voucher, the access credit operable to permit a single access to the attraction site for the customer, and upon retrieving the access credit, removing, using the voucher engine, the access credit from the attraction voucher; and setting a validation flag for the access privilege data upon a successful determination of the multi-access metadata or successful retrieval of the access credit; and upon a positive determination of the validation flag for the access privilege data, constructing and transmitting, to the attraction verification terminal, a virtual access token permitting the access request for the customer to access the attraction site.

2. The computer-readable medium of claim 1, further comprising instructions configured to retrieve, from a rules base, one or more validation rules based on the attraction voucher.

3. The computer-readable medium of claim 2, further comprising instructions configured to execute, using a rules engine, the one or more validation rules to determine whether to modify the access privilege data.

4. The computer-readable medium of claim 3, wherein a validation rule in the one or more validation rules is configured to modify the access privilege data to add the multi-access metadata and remove the access credit based on order data or customer data.

5. The computer-readable medium of claim 2, wherein a validation rule in the one or more validation rules comprises a time delay limitation, a time limitation, a location limitation, or a distance limitation for the attraction site.

6. The computer-readable medium of claim 1, wherein the retrieving the attraction voucher comprises:
  retrieving, from the voucher engine, a plurality of potential attraction vouchers based on one or more voucher selection rules retrieved from a rules base, each attraction voucher among the potential attraction vouchers permitting access to the attraction site; and
  selecting the attraction voucher among the potential attraction vouchers based on one or more voucher ranking rules retrieved from the rules base.

7. The computer-readable medium of claim 1, wherein the access identifier includes a universal access identifier, a virtual attraction pass, a credit card, a debit card, a quick response (QR) code, a two-dimensional barcode, or a one-dimensional barcode.

8. The computer-readable medium of claim 1, wherein the receiving the access request for the customer comprises receiving, from the attraction verification terminal, scan results to validate the access identifier for the customer.

9. A method for permitting access to an attraction site comprising:
  receiving, from a vendor, order data identifying an order placed by a customer for access to an attraction site, the order data including an access identifier that would initially be valid if validated by a voucher engine managed by the vendor and invalid if validated by a voucher engine managed by an attraction access provider;
  extracting and storing, using the voucher engine managed by the attraction access provider, the access identifier from the received order data;
  upon receiving, from an attraction verification terminal for an attraction site, an access request for a customer presenting the access identifier:
  determining and validating access privilege data for the customer based on the access request and access identifier; and
  transmitting, to the attraction verification terminal, a virtual access token permitting the access request for the customer to access the attraction site upon a determination that the access privilege data is valid.

10. The method of claim 9, wherein the order data comprises a structured email message or structured markup.

11. The method of claim 10, wherein the extracting and storing the access identifier comprises parsing the structured email message to identify the access identifier and storing the retrieved access identifier into a voucher data store.

12. The method of claim 9, wherein the order data further includes a customer identifier, name, and contact information for the customer.

13. The method of claim 9, wherein the access identifier includes a universal access identifier, a virtual attraction pass, a credit card, a debit card, a quick response (QR) code, a two-dimensional barcode, or a one-dimensional barcode.

14. The method of claim 9, wherein the receiving the access request for the customer comprises receiving, from the attraction verification terminal, scan results to validate the access identifier for the customer.

15. An apparatus for permitting access to an attraction site, comprising:
  a processor configured to:
    receive, from an attraction verification terminal for an attraction site, an access request for a customer presenting an access identifier;
    retrieve, from a voucher engine, a plurality of potential attraction vouchers based on the access identifier, each attraction voucher among the plurality of potential attraction vouchers permitting access to the attraction site;
    rank the plurality of potential attraction vouchers and select an attraction voucher among the ranked plurality of potential attraction vouchers;
    construct and validate access privilege data based on the selected attraction voucher; and
    construct and transmit, to the attraction verification terminal, a virtual access token permitting the access request for the customer to access the attraction site upon a determination that the access privilege data is valid.

16. The apparatus of claim 15, wherein the processor configured to retrieve a plurality of potential attraction vouchers based on the access identifier comprises the processor being configured to retrieve, from a rules base, one or more voucher selection rules and execute, using a rules engine, the one or more voucher selection rules to identify the plurality of potential attraction vouchers.

17. The apparatus of claim 15, wherein the processor configured to rank the plurality of potential attraction vouchers and select the attraction voucher among the ranked plurality of potential attraction vouchers comprises the processor being configured to retrieve, from a rules base, one or more voucher ranking rules and execute, using a rules engine, the one or more voucher ranking rules to rank the plurality of potential attraction vouchers.

18. The apparatus of claim 15, wherein the access identifier includes a universal access identifier, a virtual attraction pass, a credit card, a debit card, a quick response (QR) code, a two-dimensional barcode, or a one-dimensional barcode.

19. The apparatus of claim 15, wherein the processor configured to receive the access request for the customer comprises the processor being configured to receive, from the attraction verification terminal, scan results to validate the access identifier for the customer.

20. The apparatus of claim 15, wherein the attraction site comprises a sightseeing experience, a bus tour, a boat tour, a helicopter tour, a walking tour, a bicycle tour, a building tour, a theatre show, a play, a musical, a museum, an observatory, a restaurant, a food or drink experience, a shopping experience, an escape room, a library, or a historical building.

* * * * *